(12) United States Patent
Suzuki

(10) Patent No.: US 7,270,902 B2
(45) Date of Patent: Sep. 18, 2007

(54) APPARATUS FOR CONTROLLING ELECTRIC POWER FROM FUEL CELL

(75) Inventor: Keisuke Suzuki, Kanagawa-ken (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 424 days.

(21) Appl. No.: 10/200,213

(22) Filed: Jul. 23, 2002

(65) Prior Publication Data

US 2003/0022034 A1  Jan. 30, 2003

(30) Foreign Application Priority Data

Jul. 24, 2001 (JP) ............................. 2001-223169

(51) Int. Cl.
  *H01M 8/04* (2006.01)
  *H01M 8/12* (2006.01)
(52) U.S. Cl. ............................. 429/22; 429/23; 429/25
(58) Field of Classification Search .................. 429/22, 429/25
See application file for complete search history.

(56) References Cited

U.S. PATENT DOCUMENTS 5,346,778 A * 9/1994 Ewan et al. ................... 429/19

5,366,821 A * 11/1994 Merritt et al. ................ 429/21

FOREIGN PATENT DOCUMENTS

JP   7-75214    3/1995
JP   10-284102  10/1998

* cited by examiner

*Primary Examiner*—Stephen Kalafut
*Assistant Examiner*—Julian Mercado
(74) *Attorney, Agent, or Firm*—Foley & Lardner LLP

(57) ABSTRACT

A target electric power operating part (2) operates a target electric power of a fuel cell. A running target point operating part (3) operates targets of both pressure of gas and mass flow rate of gas. A running point controlling part (4) controls a running point of the fuel cell. A running state detecting part (5) detects a running state of the fuel cell. An output power limit operating part (6) operates a limit of the output power produced by the fuel cell, based on the running state e.g., pressure of the gas detected in the running state detecting part (5). A commanded output power operating part (7) operates a commanded output power, the commanded output power being defined as a minimum value between an output from the output power limit operating part (6) and an output from the target electric power operating part (2).

11 Claims, 12 Drawing Sheets

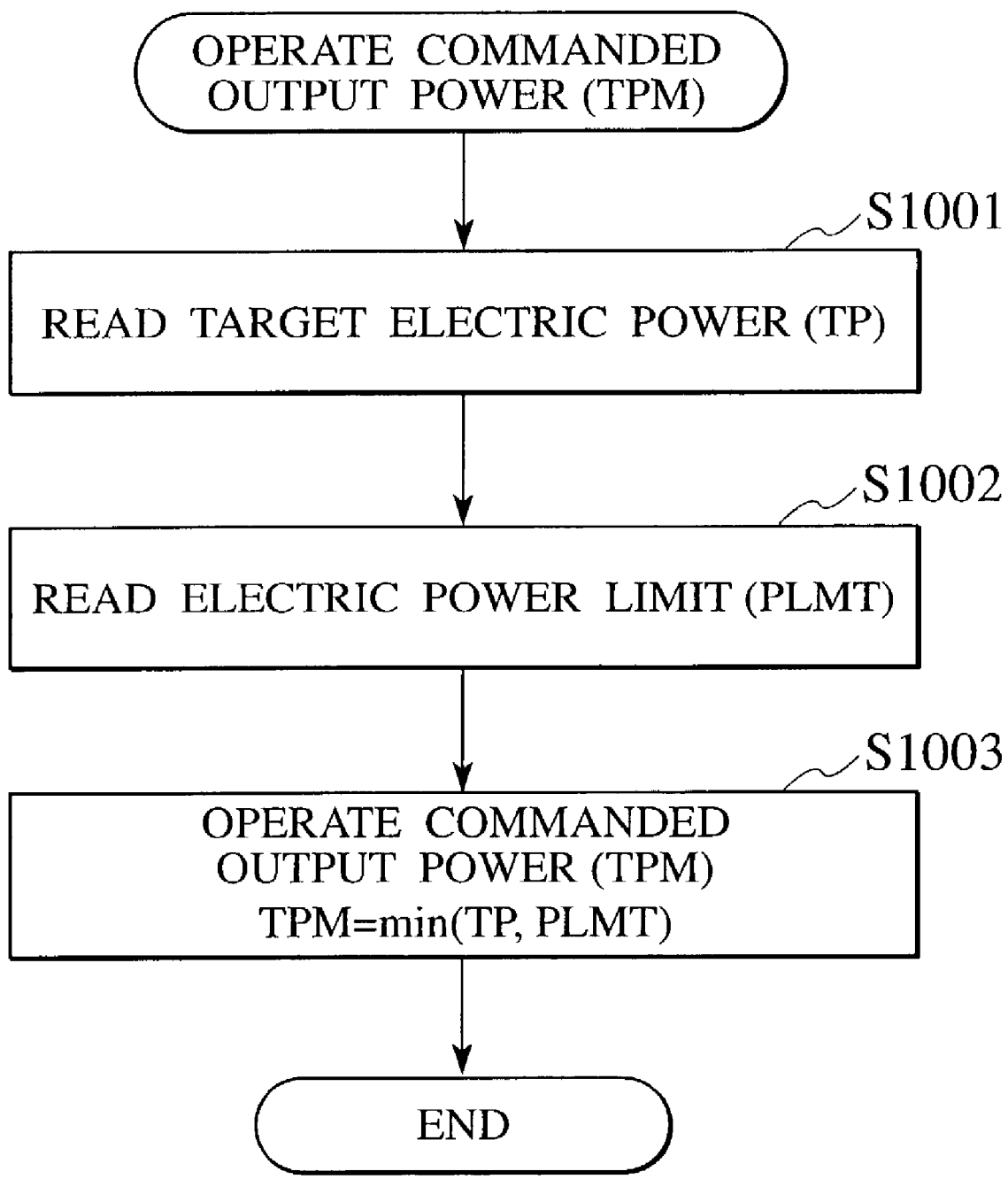

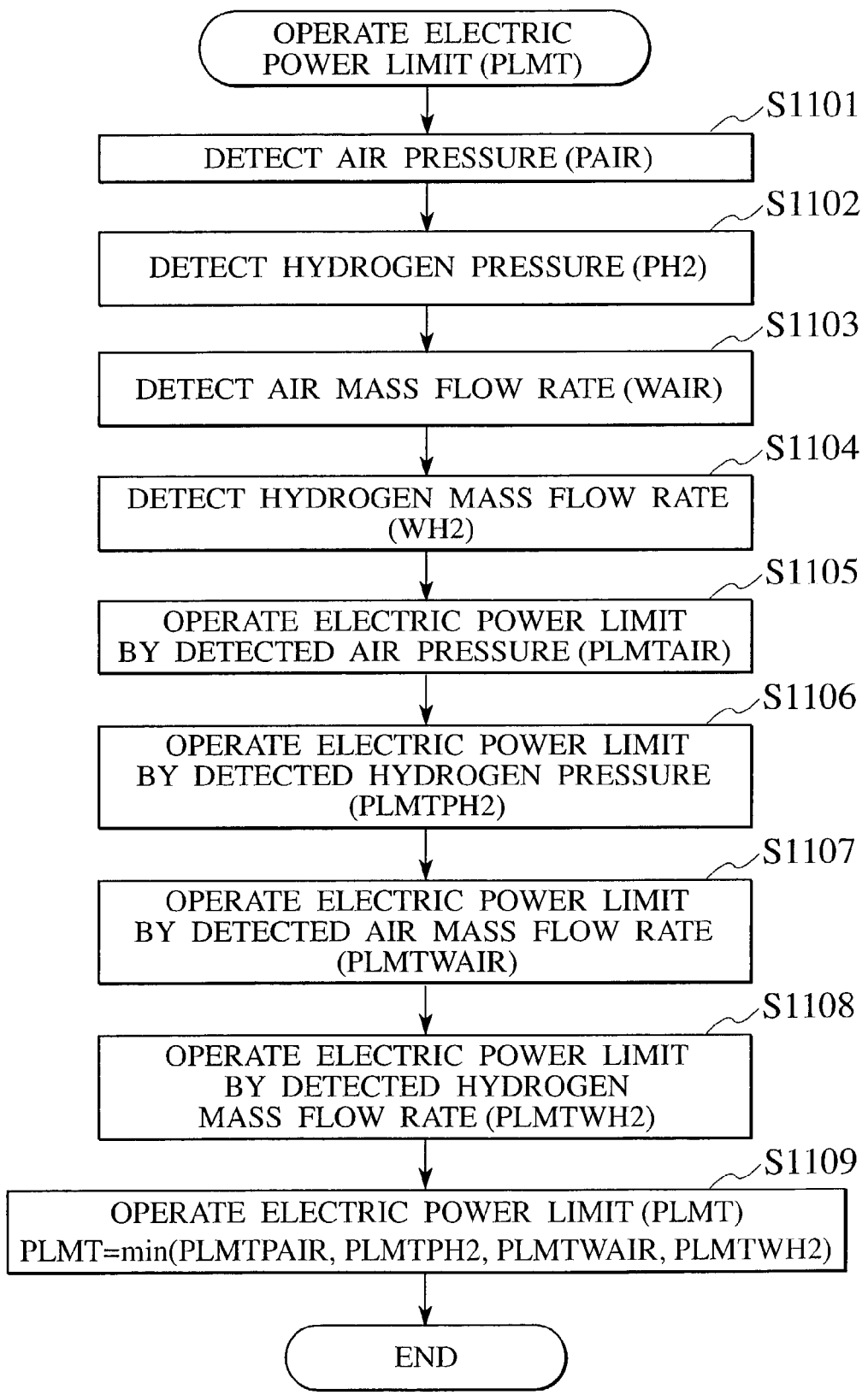

APPARATUS FOR CONTROLLING ELECTRIC POWER FROM FUEL CELL

BACKGROUND OF THE INVENTION

1. Field of the Invention

The present invention relates generally to a fuel cell system, and more particularly, to an apparatus for controlling electric power from a fuel cell, which takes a transient response of a gas controlling system of the fuel cell into account.

2. Description of the Related Art

A running state (working fluid is gas in this state) may respond slowly as demanded output power from a fuel cell increases. Therefore, producible output power may not satisfy the demanded output power. When the demanded output power increases, if the demanded output power is attempted to be produced, output voltage from the fuel cell may fall and the fuel cell may deteriorate. Japanese Patent Application Laid-Open No. H10-284102 (Hereafter, this application is called a first conventional art.) and Japanese Patent Application Laid-Open No. H7-75214 (Hereafter, this application is called a second conventional art.) are known as conventional arts to solve the above problems.

The first conventional art has features that a function generator sets a transient upper limit of an electric current corresponding to the inputted target output, and that output power from the fuel cell is restricted so that electric current produced from the fuel cell does not exceed the transient upper limit of the electric current.

The second conventional art has features that a target mass flow rate of air being necessary for the demanded output power is set, and that an ultimately demanded output power is determined based on a detected mass flow rate of the air.

SUMMARY OF THE INVENTION

However, the first conventional art includes a function generator which inputs a target value of a electric power and sets an upper limit of electric current corresponding to the target value thereof.

The first conventional art has following problems. Namely, the first conventional art is constituted by output power from the fuel cell being restricted so that electric current generated by the fuel cell does not exceed the upper limit of the electric current. If the upper limit of the electric current, which is set by a function generator, rises with a fast transient response and the electric current is produced based on the fast transient response, the electric current will be overproduced. Therefore, output voltage from the fuel cell is radically lowered. Accordingly, the output power from the fuel cell may not be sufficiently produced. To the contrary, taking safety into account in the performance of the fuel cell, if the upper limit of the electric current, which is set by a function generator, rises with a very slow transient response and the electric current is produced based on the very slow transient response, there is no fear that the output voltage from the fuel cell will be radically lowered and that the output power will not be sufficiently produced. However, the transient response of the output power from the fuel cell is reduced.

The output power is obtained by a measured mass flow rate of air in the second conventional art. However, the second conventional art has following problems. When the measured mass flow rate of the air is higher than a target mass flow rate of the air for some reason, demanded electric power is higher than generatable electric power. Thus, an initial object, which is to prevent the output voltage from being lowered, cannot be achieved. Moreover, in the second conventional art, the output power is obtained by not taking the pressures of the air and fuel (i.e., hydrogen) into account, but taking the measured mass flow rate of the air into account. The output voltage from the fuel cell greatly depis completed on the pressure (and the density corresponding to the pressure). However, even if the pressures of the air and hydrogen do not reach sufficient values, the output power is produced due to the mass flow rate of the air. Therefore, the output voltage from the fuel cell may be radically lowered, so that the output power from the fuel cell may not be sufficiently produced.

It is an object of the present invention to provide an apparatus for controlling electric power from a fuel cell, which prevents electric current of the fuel cell from being produced excessively and prevents output voltage from the fuel cell from radically decreasing at a transient time. It is another object of the present invention to provide an apparatus for controlling electric power from a fuel cell to secure the response of the electric power.

The first aspect of this invention provides an apparatus for controlling electric power from a fuel cell, comprising: a target electric power operating unit for operating a target electric power of the fuel cell; a running target point operating unit for operating targets of both pressure and mass flow rate of gas being supplied to at least the fuel cell, based on an output from the target electric power operating unit; a running point controlling unit for controlling a running point of the fuel cell, based on an output from the running target point operating unit; a running state detecting unit for detecting a running state of the fuel cell; a producible output power operating unit for operating a producible output power produced by the fuel cell, based on an output from the running state detecting unit; and a commanded output power operating unit for operating a commanded output power based on the producible output power.

BRIEF DESCRIPTION OF THE DRAWINGS

FIG. 10 is a detailed flowchart showing a subroutine 1000 in FIG. 8, for operating output commanded power according to first and second embodiments of the present invention;

FIG. 11 is a detailed flowchart showing a subroutine 1100 in FIG. 8, for operating electric power limit according to a second embodiment of the present invention;

DETAILED DESCRIPTION OF THE PREFERRED EMBODIMENTS

Hereafter, in order to describe the present invention more in detail, preferred embodiments of this invention will be explained with reference to the accompanying drawings below.

Figure 1:
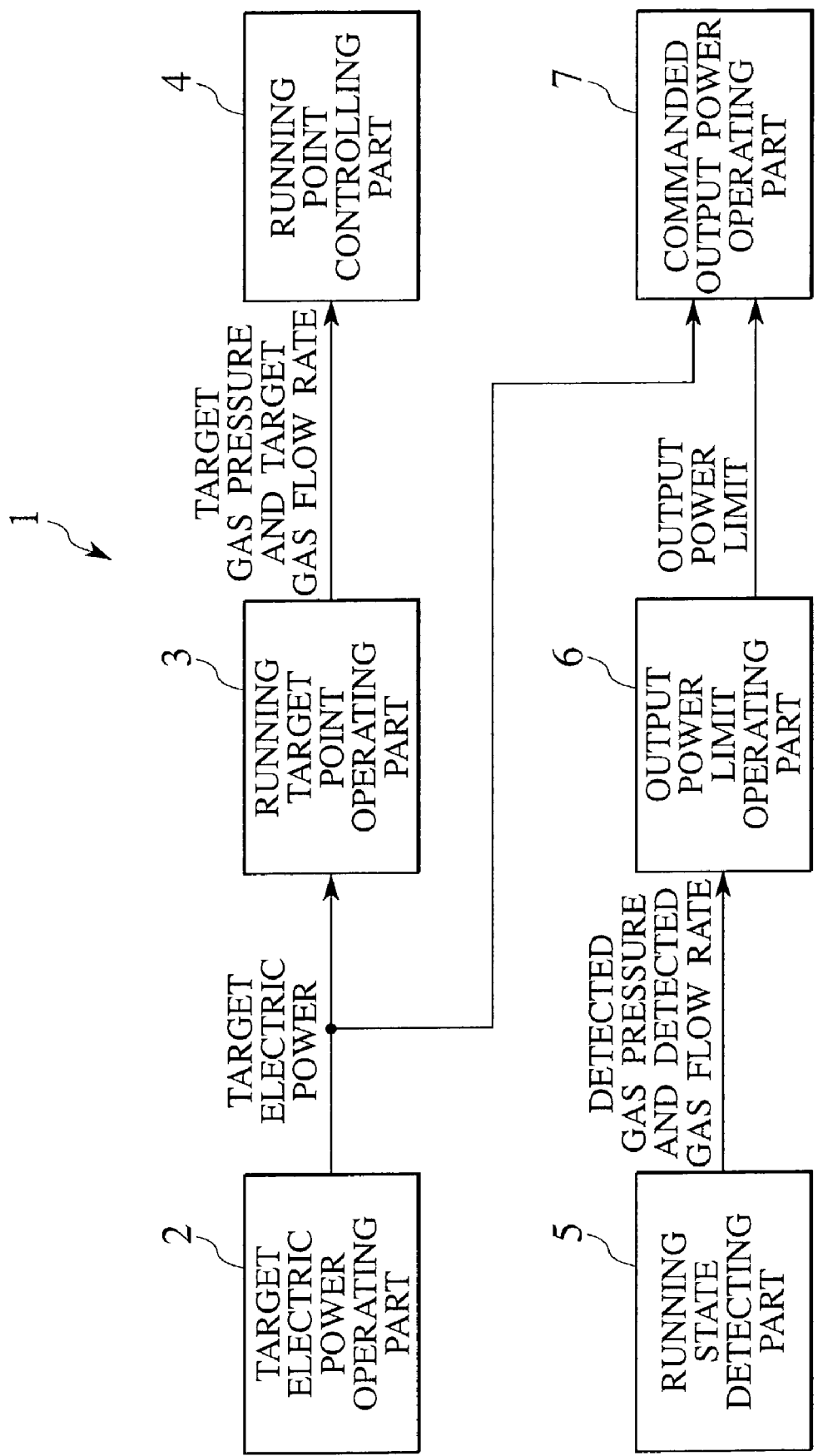
FIG. 1 is a block diagram showing an apparatus controlling electric power from a fuel cell according to the present invention.

FIG. 1 shows a substantial structure of an apparatus for controlling electric power of a fuel cell according to the present invention. The apparatus for controlling electric power 1 is constituted by a target electric power operating part 2, a running target point operating part 3, a running point controlling part 4, a running state detecting part 5, an output power limit operating part 6 and a commanded output power operating part 7.

The target electric power operating part 2 is target electric power operating means for operating target electric power of the fuel cell. The running target point operating part 3 is a running target point operating means for operating running target points of pressure and mass flow rate of gases (air and hydrogen) based on an output from the target electric power operating part 2. The running point controlling part 4 is a running point controlling means for controlling a running point of the fuel cell based on an output from the running target point operating part 3. The running state detecting part 5 is a running state detecting means for detecting running states including the pressure of the gases and the like of the fuel cell. The output power limit operating part 6 is an output power limit operating means for operating a limit of an output power produced by the fuel cell based on an output from the running state detecting part 5. The commanded output power operating part 7 is a commanded output power operating means for determining by using the following method. Namely, if the output from the output power limit operating part 6 is lower than the output from the target electric power operating part 2, then the commanded output power is defined as the output from the output power limit operating part 6. If the output from the target electric power operating part 2 is lower than the output from the output power limit operating part 6, then the commanded output power is defined as the output from the target electric power operating part 2.

In the case that the fuel cell of the present invention is applied to e.g., a main power supply of an electric vehicle, the target electric power operating part 2 detects the work amount of an accelerator pedal by a driver, a vehicle speed and the like. The target electric power is operated in the target electric power operating part 2 based on the above-detected data.

Figure 2:
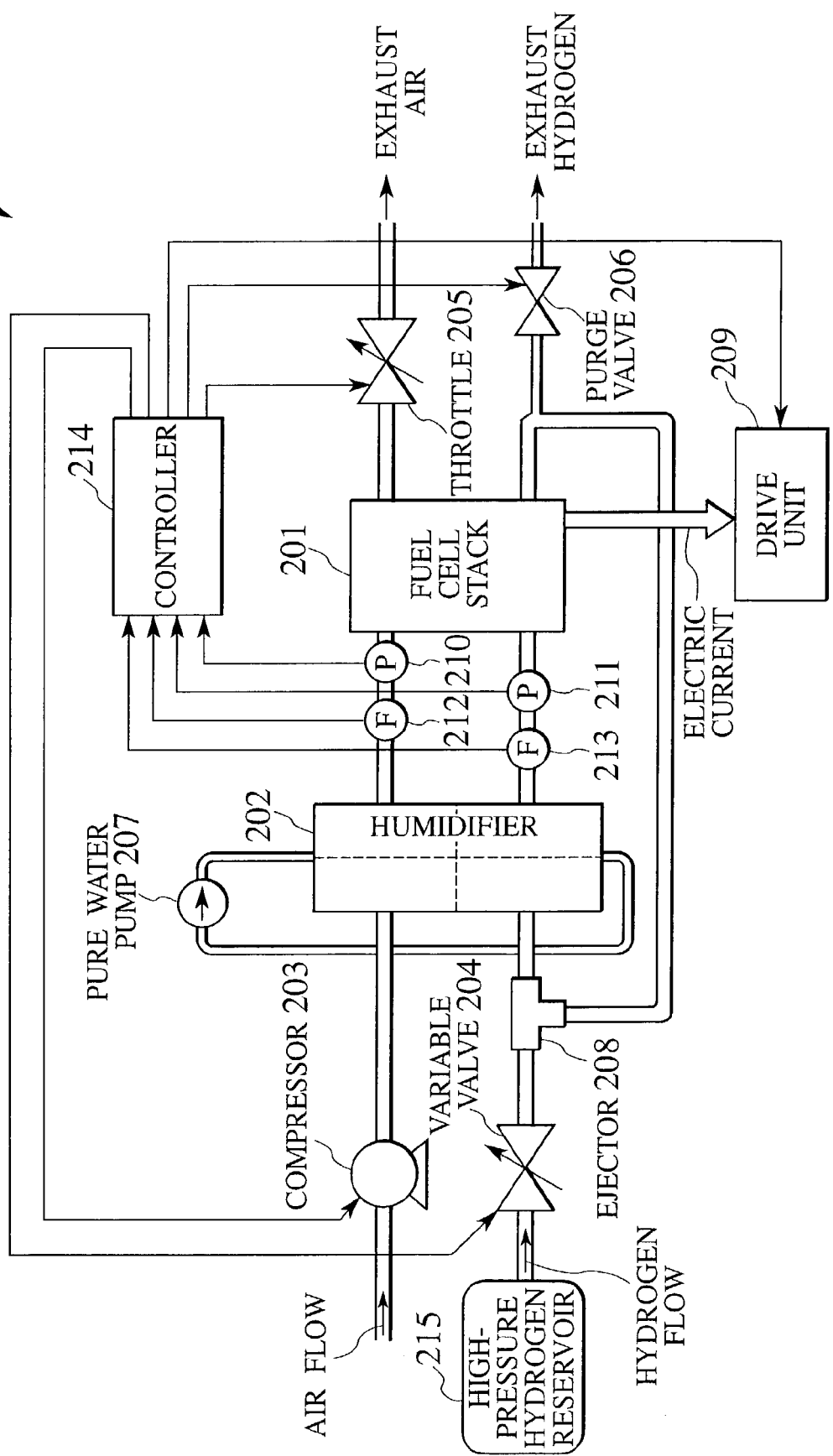
FIG. 2 is a structural diagram schematically showing a fuel cell system according to the present invention.

FIG. 2 shows a system diagram illustrating one embodiment of a fuel cell system according to the present invention.

As shown in FIG. 2, a fuel cell stack 200 is constituted by a fuel cell stack 201, a humidifier 202, a compressor 203, a variable valve 204, a throttle 205, a purge valve 206, a pure water pump 207, an ejector 208, a drive unit 209, an air pressure gauge 210, a hydrogen pressure gauge 211, an air flow meter 212, a hydrogen flow meter 213 and a controller. The apparatus for controlling electric power 1 is included as one control unit in the controller 214.

The humidifier 202 humidifies the air with pure water supplied from the pure water pump 207. The humidified air flows to the fuel cell stack 201. The humidifier 202 also humidifies the hydrogen with pure water supplied from the pure water pump 207. The humidified hydrogen flows in the fuel cell stack 201 through the ejector 208. The air is inlet from the atmosphere, and then the inlet air is compressed by the compressor 203. The compressed air flows in the humidifier 202. The variable valve 204 controls the flow rate and the pressure of the hydrogen which flows from a high-pressure hydrogen reservoir 215 to the humidifier 202. The throttle 205 is provided at the exhaust air side of the fuel cell stack 201 and controls the pressure and the flow rate of the air. The purge valve 206 is provided at the exhaust hydrogen side of the fuel cell stack 201 and discharges the hydrogen to the atmosphere. The pure water pump 207 supplies pure water to the humidifier 202. The unused hydrogen, which is exhausted from the fuel stack 201, flows back to upstream of the humidifier 202 via the ejector 208. The drive unit 209 produces the output power from the fuel cell stack 201. The air pressure gauge 210 detects the air pressure at an entrance of the fuel cell stack 201. The hydrogen pressure gauge 211 detects the hydrogen pressure at the entrance of the fuel cell stack 201. The air flow meter 212 detects the mass flow rate of the air flowing in the fuel cell stack 201. The hydrogen flow meter 213 detects the mass flow rate of the hydrogen flowing in the fuel cell stack 201. The signals detected by the above sensors are input to the controller 214 and the controller 214 drives each actuator based on the control software stored in the controller 214.

The fuel cell stack 201 generates the electric power by reaction between the air and the hydrogen. The air and the hydrogen flow from the humidifier 202 to the fuel cell stack 201. The electric power (electric current) is supplied to an external system, that is, a vehicle and the like. The remaining air is exhausted out of the fuel cell stack 201 after the reaction between the air and the hydrogen in the fuel cell stack 201. The remaining air is controlled about pressure thereof in the throttle 205, and then the remaining air is discharged to the atmosphere. Further, the remaining hydrogen is exhausted out of the fuel cell stack 201 after the reaction between the air and the hydrogen in the fuel cell stack 201. The remaining hydrogen flows back to upstream of the humidifier 202 via the ejector 208, whereby the remaining hydrogen is reutilized in power generation.

The air pressure gauge 210, the air flow meter 212, the hydrogen pressure gauge 211 and the hydrogen flow meter 213 are provided at an entrance of the fuel cell stack 201. The detected values of these detectors are input to the controller 214.

The controller 214 controls the compressor 203, the variable valve 204 and throttle 205, whereby the above detected values input to the controller 214 are set corresponding to the predetermined targets, which are obtained by the target electric power at the time. Moreover, corresponding to the detected pressures and flow rate against the targets, the controller 214 controls so as to limit a produced output power (electric current) from the fuel cell stack 201 to the drive unit.

The running state detecting part 5 in FIG. 1 corresponds to the air pressure gauge 210, the hydrogen pressure gauge 211, the air flow meter 212 and the hydrogen flow meter 213 in FIG. 2. The running point controlling part 4 in FIG. 1 corresponds to the compressor 203, the variable valve 204, the throttle 205 and the purge valve 206 in FIG. 2.

Figure 3A:
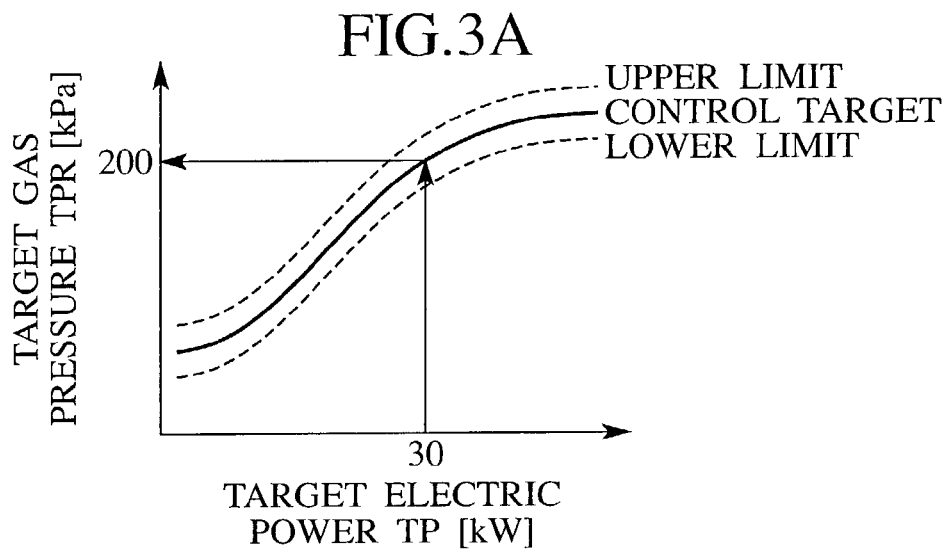
FIG. 3A shows a relation between target electric power and target gas pressure.
Figure 3B:
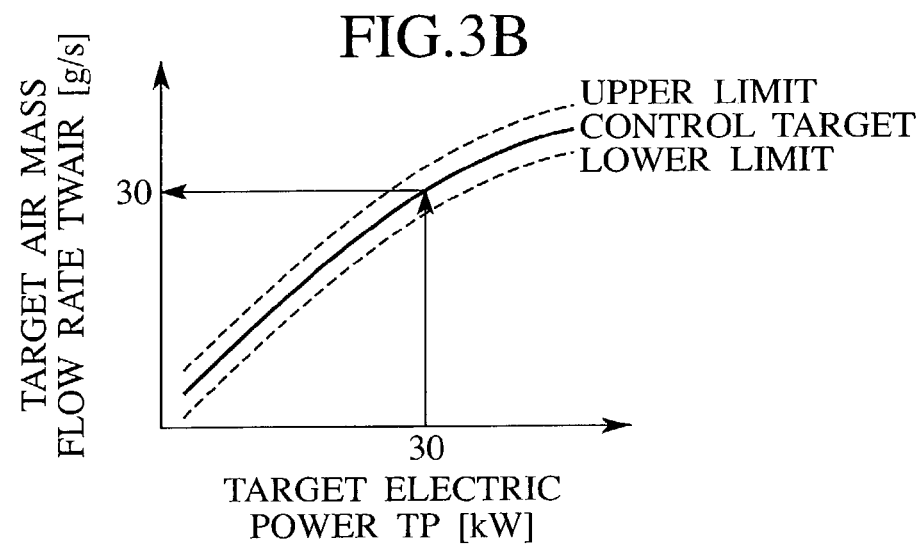
FIG. 3B shows a relation between target electric power and target gas mass flow rate.
Figure 3C:
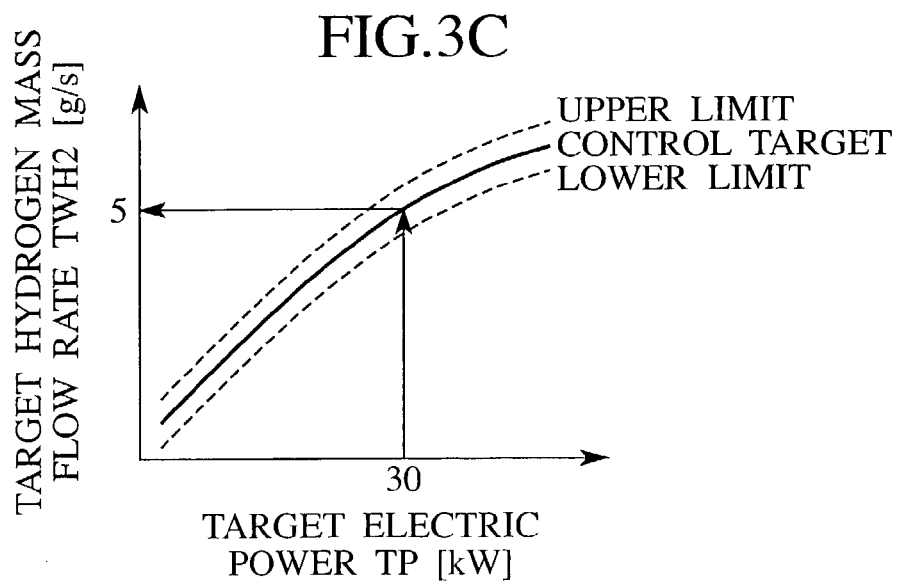
FIG. 3C shows a relation between target electric power and target hydrogen mass flow rate.

FIGS. 3A to 3C are graphs illustrating the target gas pressure table, the target air mass flow rate table and the target hydrogen mass flow rate table, which are referred to when the running target point operating part 3 operates the target gas pressure, the target air mass flow rate and the target hydrogen mass flow rate based on the target electric power, respectively. The target hydrogen pressure and the target air pressure are equal to each other in order to set a pressure difference between both surfaces of each electrolyte membrane in the fuel cell stack to be a predetermined value or lower. Such pressures will be called target gas pressures.

Figure 4A:
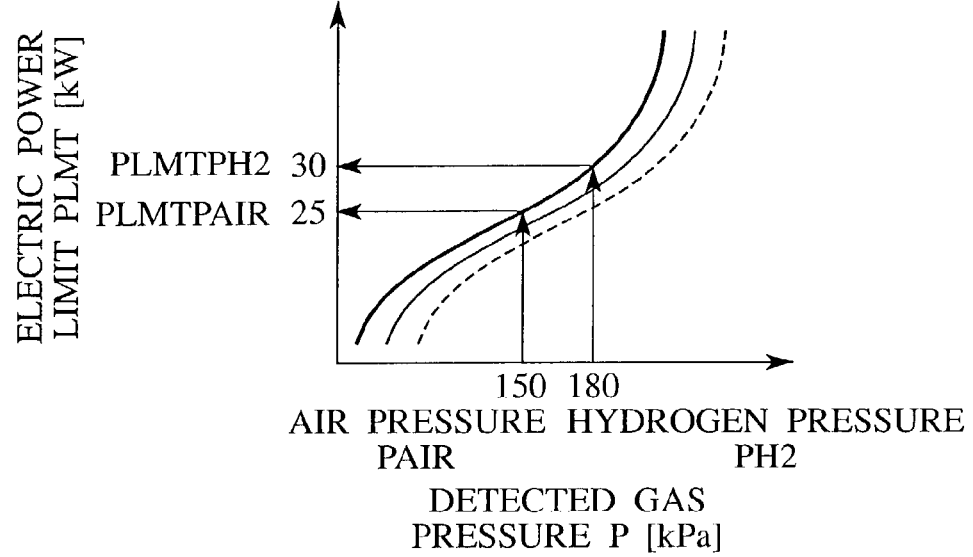
FIG. 4A shows a relation between detected gas pressure and electric power limit.
Figure 4B:
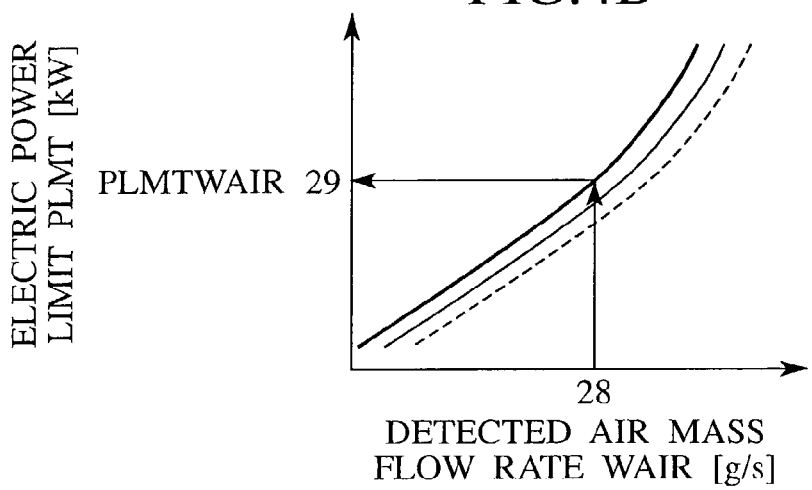
FIG. 4B shows a relation between detected air mass flow rate and electric power limit.
Figure 4C:
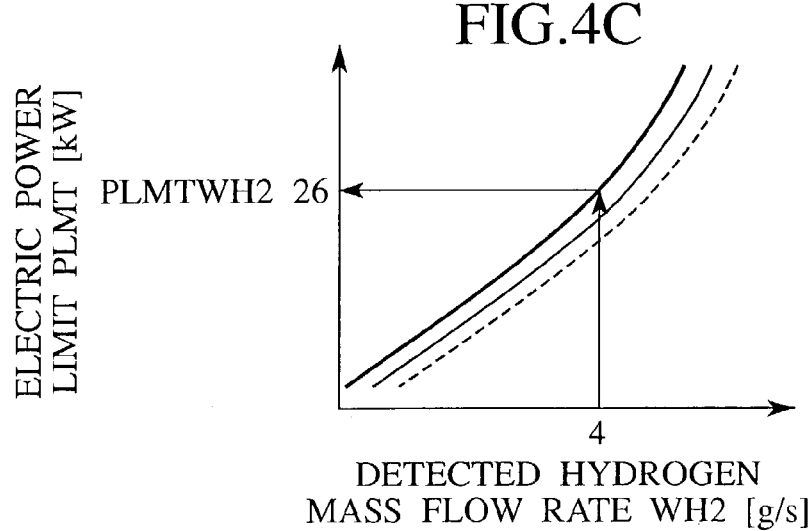
FIG. 4C shows a relation between detected hydrogen mass flow rate and electric power limit.

FIGS. 4A to 4C are graphs illustrating electric power limit tables, which are referred to when the output power limit operating part 6 operates electric power limits based on the detected values in the running state detecting part 5, respectively. FIG. 4A is a graph of the electric power limit based on the detected gas pressure. FIG. 4B is a graph of the electric power limit based on the detected air mass flow rate. FIG. 4C is a graph of the electric power limit based on the detected hydrogen mass flow rate. The graphs of FIGS. 3A to 3C and the graphs of FIGS. 4A to 4C are in a reverse relation to each other, respectively.

Figure 5A:
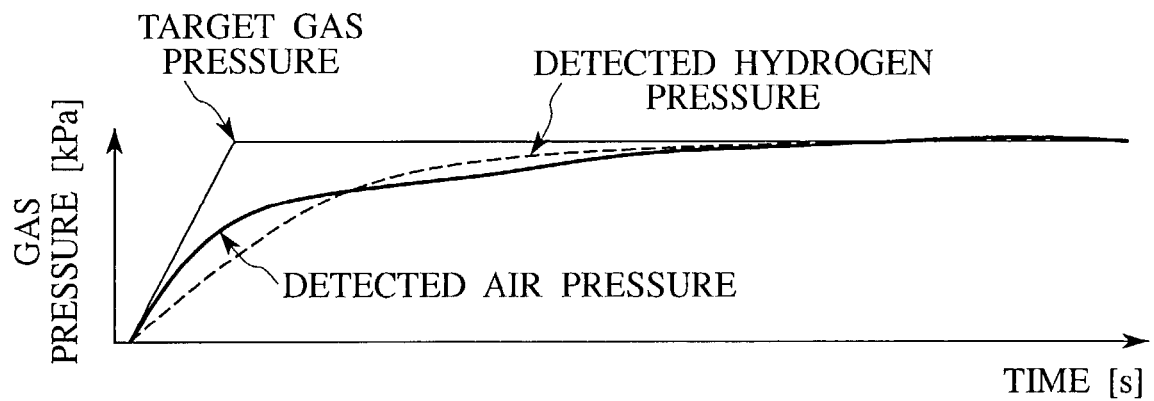
FIG. 5A is a time chart showing target gas pressure, detected air pressure and detected hydrogen pressure against time, respectively, according to a related electric power controlling method of a fuel cell.
Figure 5B:
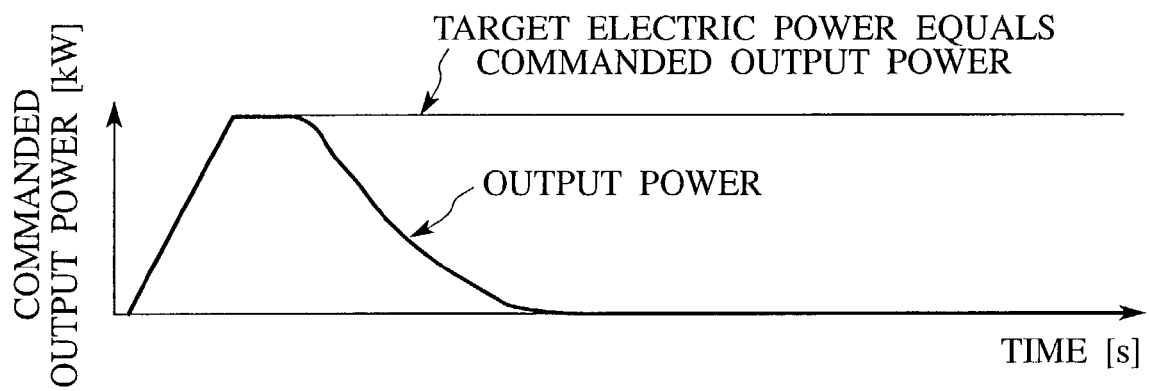
FIG. 5B is a time chart showing target electric power and output power against time, respectively, according to a related electric power controlling method of a fuel cell.
Figure 5C:
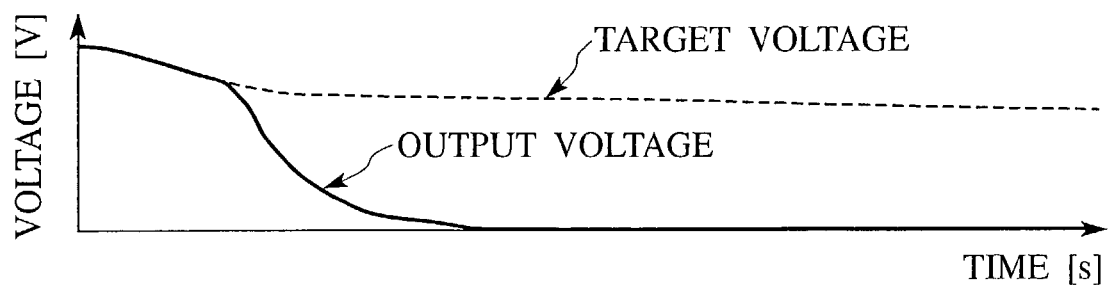
FIG. 5C is a time chart showing target voltage and output voltage against time, respectively, according to a related electric power controlling method of a fuel cell.

FIGS. 5A to 5C are time charts showing the gas pressure, the commanded output power and the output voltage against time respectively when the target electric power increases. Now, assuming that the target electric power of the fuel cell radically rises by an acceleration operation of the driver or the like as shown in FIG. 5B, then the target gas pressure for realizing the target electric power also similarly rises based on the target gas pressure table illustrated in FIG. 3A. The hydrogen pressure and the air pressure are controlled toward the target gas pressures. However, responses of the hydrogen and air pressures are delayed as shown in FIG. 5A, so that it takes time for the hydrogen and air pressures to reach the target gas pressures. Accordingly, if the commanded output power produced from the fuel cell equals the target electric power as shown in FIG. 5B, then the output power according to the command from the controller 214 can be initially produced. However, a large output power is produced under a situation where the pressures do not reach the target gas pressures. Hence, as shown in FIG. 5C, the output voltage from the fuel cell is radically lowered. Consequently, the fuel cell sometimes may fall to a state where the electric power cannot be generated.

Figure 6A:
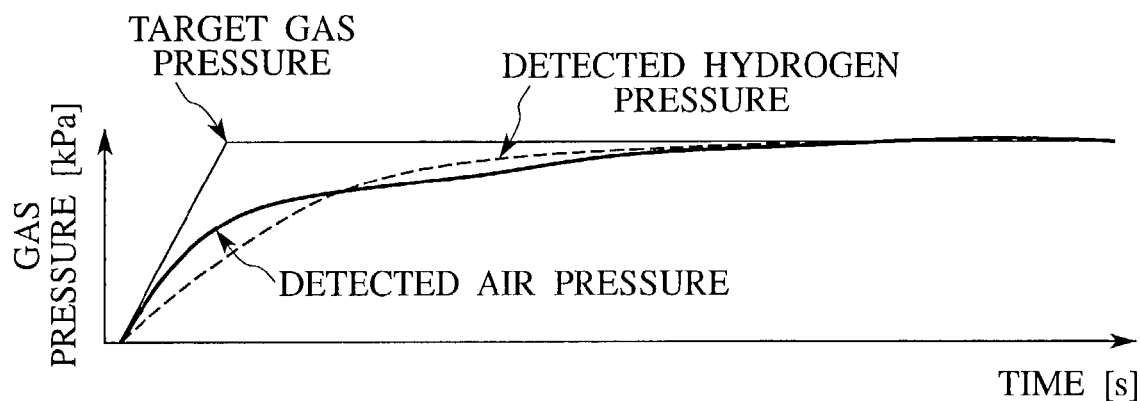
FIG. 6A is a time chart showing target gas pressure, detected air pressure and detected hydrogen pressure against time, respectively, using an electric power controlling method based on only gas pressure according to the present invention.
Figure 6B:
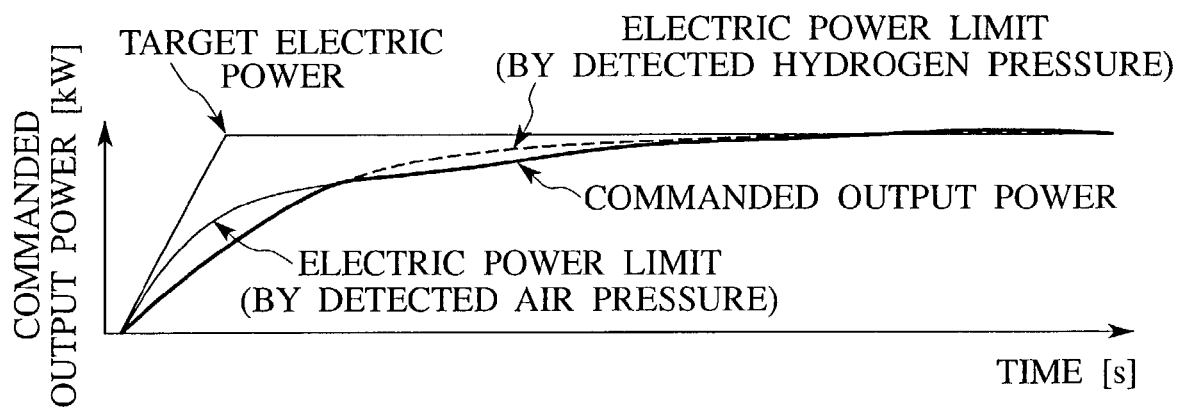
FIG. 6B is a time chart showing target electric power, commanded output power, electric power limited by detected air pressure and electric power limited by detected hydrogen pressure against time, respectively, using an electric power controlling method based only on gas pressure according to the present invention.
Figure 6C:
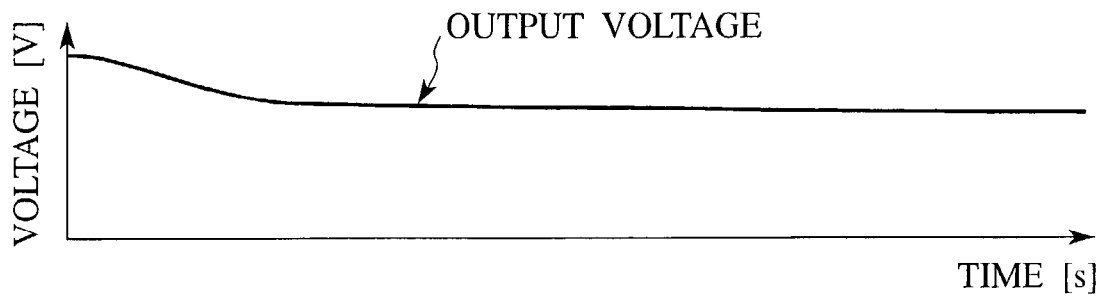
FIG. 6C is a time chart showing output voltage against time, using an electric power controlling method based on only gas pressure according to the present invention.

It is conceived that the commanded output power is limited by the maximum output power that can be produced in response to the gas pressure at each time, and that the output power is thus produced from the fuel cell without greatly lowering the output voltage. FIGS. 6A to 6C show such above-described state. FIGS. 6A to 6C show the case where the target electric power rises similarly to the target electric power of FIGS. 5A to 5C, and based on the profile of the target electric power, the target gas pressure obtained by the target gas pressure table illustrated in FIG. 3A rises. Also in this case, the detected gas pressure reaches the target gas pressure with delay as is shown in FIG. 6A.

In order to avoid producing the output power equal to or more than the output power that can be produced from the fuel cell in response to the gas pressure at the time, the detected pressures of the air and hydrogen are detected, by which a table search is carried out with reference to FIG. 4A in the reverse relation to FIG. 3A. Then, the commanded output power is limited by the electric power limit as a result of the table search.

In FIG. 3A, in some cases, both a control target and upper/lower limit which allow a variation range of the control target may be set over the gas pressure for generating a certain target electric power. In this case, in the reverse table illustrated in FIG. 4A, table data are prepared based on data corresponding to the lower limit of the pressure against the same target electric power in FIG. 3A in terms of the minimum pressure to be secured for generating the electric power. Based on the prepared data, the output power limit in response to the detected air pressure detected hydrogen pressure of the air and hydrogen is calculated.

Since the output voltage from the fuel cell is governed by whether or not the air pressure and hydrogen pressure can be sufficiently secured, the above-described method based on the air and hydrogen pressures is effective. However, in the case that a sensor for detecting the air and hydrogen mass flow rates is provided, the output power is limited based on the detected air and hydrogen mass flow rates in addition to the pressures, thereby the control accuracy of the output power can be further improved. FIGS. 7A to 7E show states in this case.

Figure 7A:
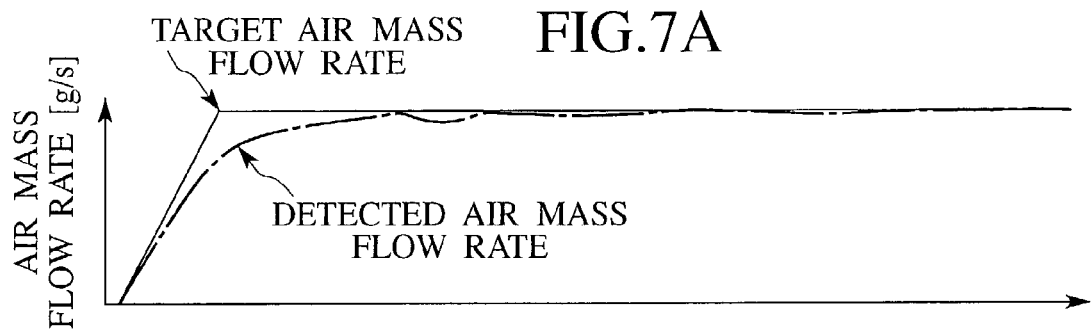
FIG. 7A is a time chart showing target air mass flow rate and detected air mass flow rate against time, respectively, using an electric power controlling method based on both gas pressure and gas mass flow rate according to the present invention.
Figure 7B:
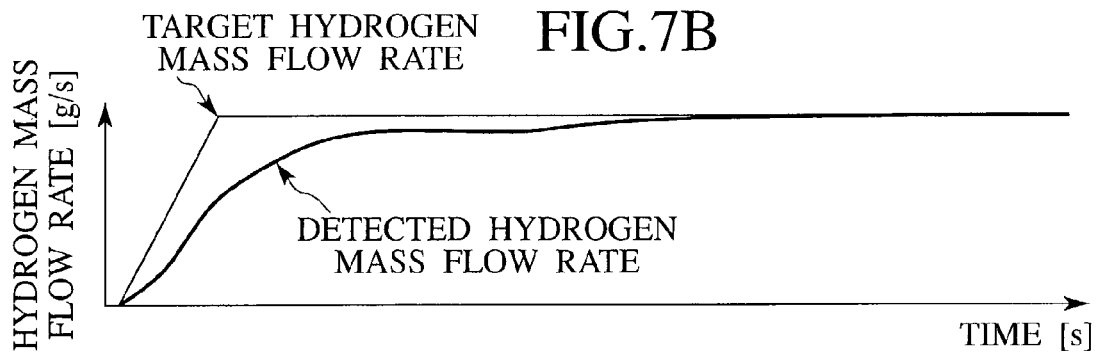
FIG. 7B is a time chart showing target hydrogen mass flow rate and detected hydrogen mass flow rate against time, respectively, using an electric power controlling method based on both gas pressure and gas mass flow rate according to the present invention.
Figure 7C:
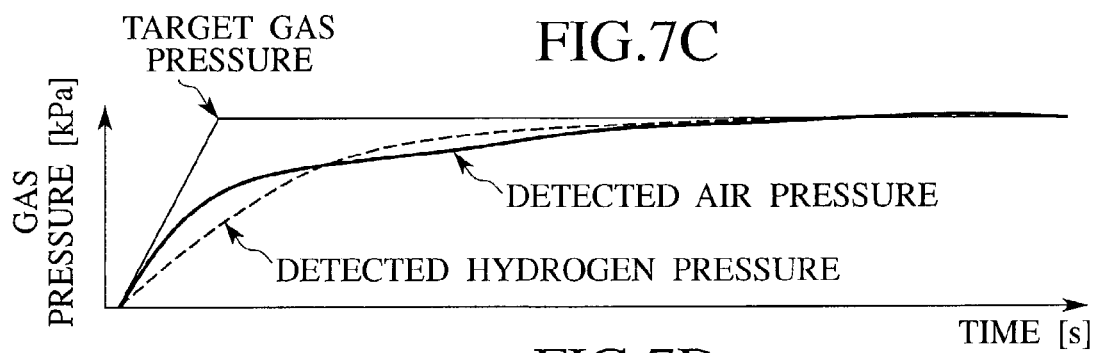
FIG. 7C is a time chart showing target gas pressure, detected air pressure and detected hydrogen pressure against time, respectively, using an electric power controlling method based on both gas pressure and gas mass flow rate according to the present invention.
Figure 7D:
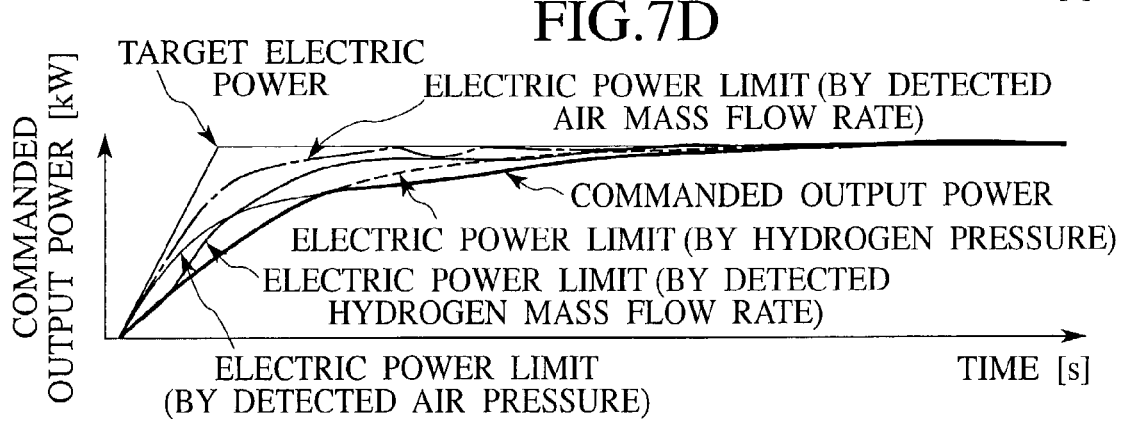
FIG. 7D is a time chart showing target electric power, commanded output power, electric power limited by detected air pressure, electric power limited by detected hydrogen pressure, electric power limited by detected air mass flow rate and electric power limited by detected hydrogen mass flow rate against time, respectively, using an electric power controlling method based on both gas pressure and gas mass flow rate according to the present invention.
Figure 7E:
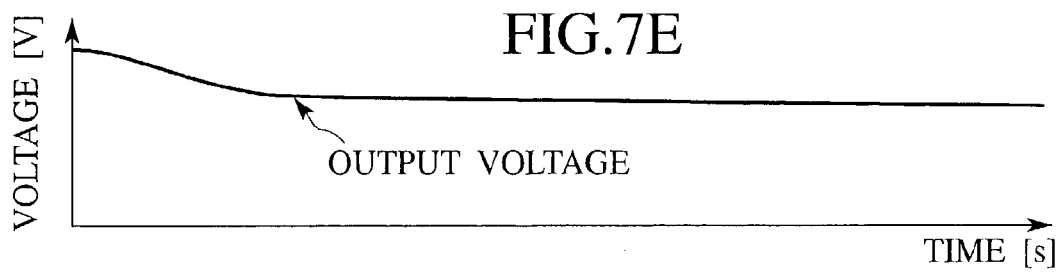
FIG. 7E is a time chart showing output voltage against time, using an electric power controlling method based on both gas pressure and gas mass flow rate according to the present invention.

Similarly to the cases of FIGS. 5A to 5C and FIGS. 6A to 6C, the target electric power of the fuel cell radically rises by the acceleration operation of the driver or the like as shown in FIG. 7D. The target gas pressure for realizing the electric power similarly rises based on the table illustrated in FIG. 3A. The target air mass flow rate rises based on FIG. 3B, and the target hydrogen mass flow rate rises based on FIG. 3C. Now, the hydrogen pressure, the air pressure, the air mass flow rate and the hydrogen mass flow rate are controlled toward the targets, respectively. However, responses of the pressures and mass flow rates are delayed as shown in FIGS. 7A to 7C. Therefore, it takes time for the respective pressures and mass flow rates to reach the targets.

In order to avoid producing the output power equal to or more than the output power that can be produced under the gas pressures and mass flow rates at that time, the detected air and hydrogen pressures are detected, by which a table search is carried out with reference to FIG. 4A as the reverse table of FIG. 3A. Further, the air mass flow rate is detected, by which a table search is carried out with reference to FIG. 4B as the reverse table of FIG. 3B. Moreover, the hydrogen mass flow rate is detected, by which a table search is carried out with reference to FIG. 4C as the reverse table of FIG. 3C. The commanded output power is restricted by the minimum electric power limit of the electric power limits as results of the above-described table searches.

Similarly to the case of an example of FIGS. 6A to 6C, for the control targets of the gas for generating the target electric power in FIGS. 3A to 3C, upper and lower limits allow the variation range of the control target may be set. In this case, in the reverse tables of FIGS. 4A to 4C, table data are prepared based on data corresponding to the lower limits of the target pressure and target mass flow rate for the same target electric power in FIGS. 3A to 3C in terms of the minimum pressure and mass flow rate to be secured for generating electric power. Output power limits are operated according to the detected air pressure, detected hydrogen pressure, detected air mass flow rate and detected hydrogen mass flow rate, based on the table data.

As shown in FIGS. 7A to 7E, the commanded output power based on the detected air pressure, detected hydrogen pressure, detected air mass flow rate and detected hydrogen mass flow rate are operated every predetermined time, thereby enabling the prevention of radical decrease of the output voltage from the fuel cell from and to producing the maximum output power.

Figure 8:
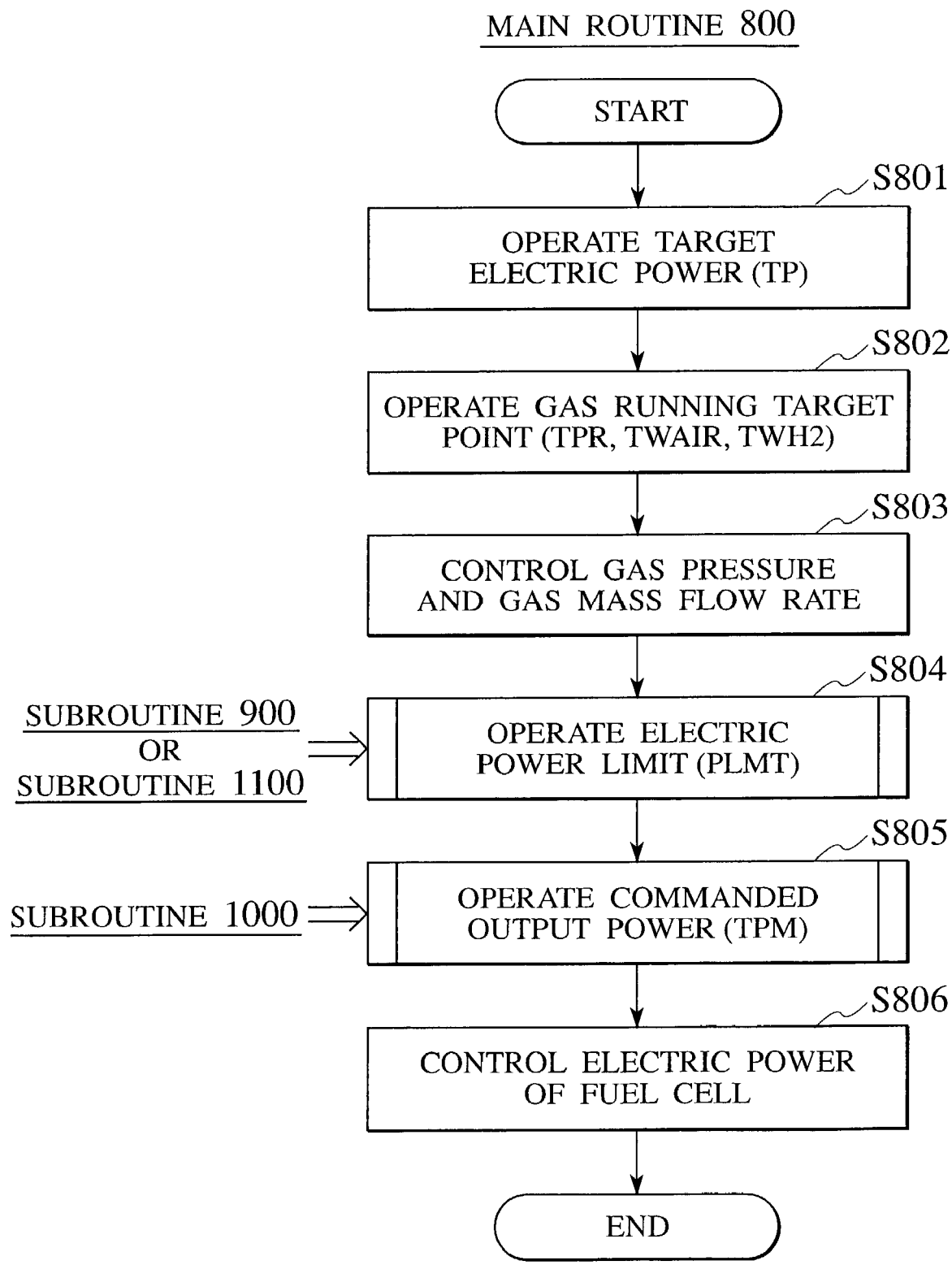
FIG. 8 is a general flowchart showing a main routine for controlling electric power of a fuel cell according to first and second embodiments of the present invention.
Figure 9:
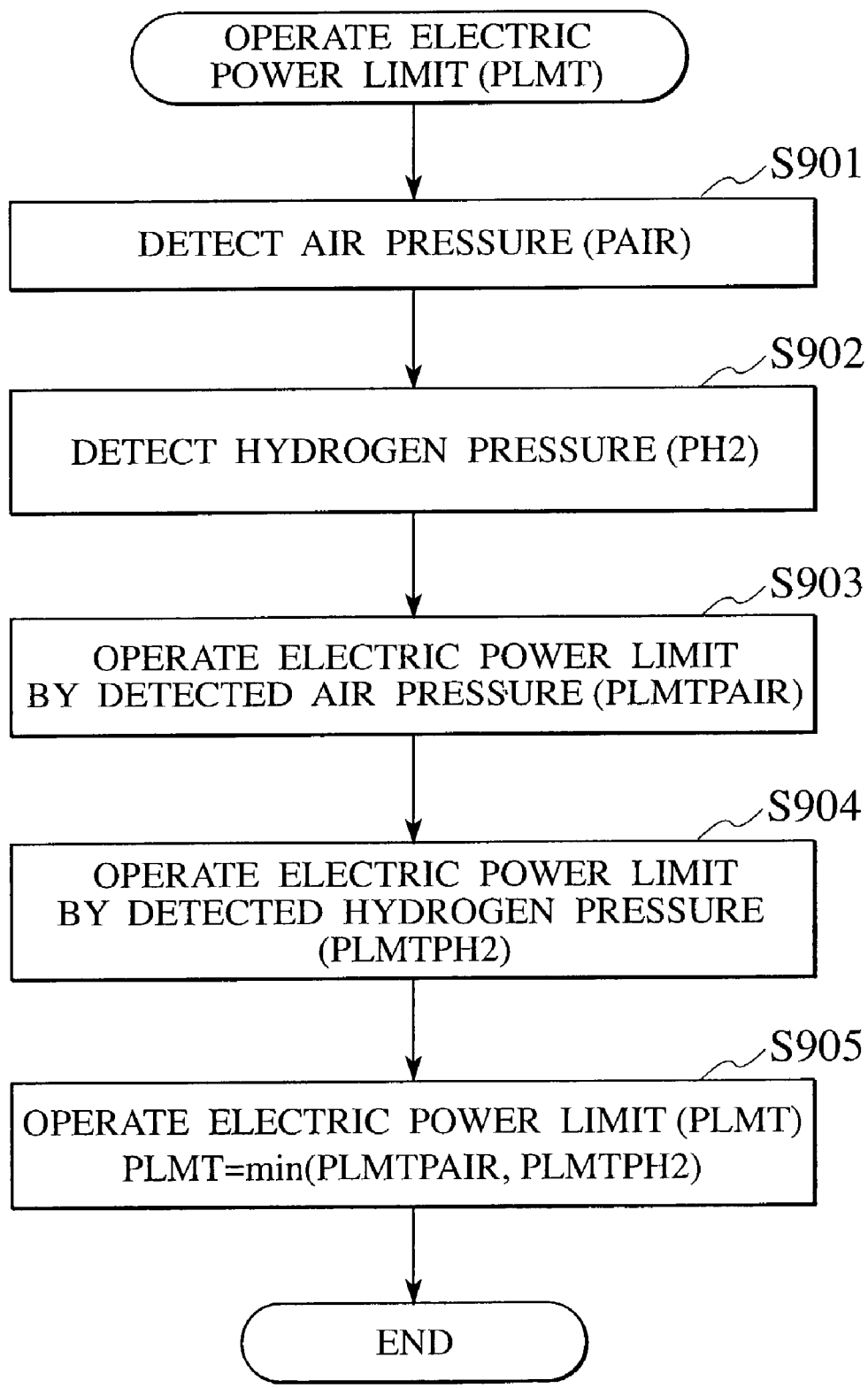
FIG. 9 is a detailed flowchart showing a subroutine 900 in FIG. 8, for operating electric power limit according to a first embodiment of the present invention.

Flowcharts of a first embodiment of the present invention are shown in FIGS. 8, 9 and 10.

FIG. 8 is a general flowchart and each process thereof is executed at predetermined intervals (e.g., every 10 [ms]) by the controller 214 shown in FIG. 2.

In the case that the fuel cell of the present invention is applied to e.g., a main power supply of an electric vehicle, the work amount of an accelerator pedal by the driver, a vehicle speed and the like are detected in step S801. Then, the target electric power TP of the fuel cell is operated based on these detected data in step S801. The target gas pressure TPR, the target air mass flow rate TWAIR and the target hydrogen mass flow rate TWH2 are operated based on the target electric power TP by reference to the table data shown in FIGS. 3A to 3C in step 802. The pressure and the mass flow rate of the gas are controlled in step S803. The electric power limit PLMT is operated based on both the gas pressure and the mass flow rate controlled in step S804. The commanded output power TPM are operated by the target electric power TP and the electric power limit PLMT in step S805. The electric power of the fuel cell is controlled based on the commanded output power TPM in step S806. A sequence of the detections, the operations and the controls is completed by the above steps.

FIG. 9 is a detailed flowchart showing a subroutine 900, that is, step 804 in FIG. 8. The subroutine 900 includes processes for operating electric power limit PLMT.

The air pressure PAIR controlled about the pressure is detected in step S901. The hydrogen pressure PH2 controlled about the pressure is detected in step S902. In step S903, the electric power limit PLMTPAIR corresponding to the detected air pressure PAIR is operated by both the detected air pressure PAIR and the table data in FIG. 4A. In step S904, the electric power limit PLMTPH2 corresponding to the detected air pressure PH2 is operated by both the detected hydrogen pressure PH2 and the table data in FIG. 4A. In step S905, comparing the PLMTPAIR with the PLMTPH2, if the PLMTPAIR is lower than the PLMTPH2, the PLMTPAIR is substituted to the electric power limit PLMT. If the PLMTPH2, on the contrary, is lower than the PLMTPAIR, the PLMTPH2 is substituted to the electric power limit PLMT. A sequence of the detections, the operations and the controls is completed by the above steps.

FIG. 10 is a detailed flowchart showing a subroutine 1000, that is, step 805 in FIG. 8. The subroutine 1000 includes processes for operating commanded output power TPM.

The target electric power TP, which is operated at step S801 in FIG. 8, is read in step S1001. The electric power limit PLMT, which is operated at step S804 in FIG. 8, is read in step 1002. In step S1003, comparing the TP with the PLMT, if the TP is lower than the PLMT, the TP is substituted to the commanded output power TPM. If the PLMT, on the contrary, is lower than the TP, the PLMT is substituted to the commanded output power TPM. A sequence of the detections, the operations and the controls is completed by the above steps.

Flowcharts about a second embodiment of the present invention are shown in FIGS. 8, 10 and 11. The second embodiment is different from the first embodiment by the feature that the electric power is controlled by using the mass flow rates detected by both the air flow meter 212 and the hydrogen flow meter 213 in addition to the pressures detected by both the air pressure gauge 210 and the hydrogen pressure gauge 211.

FIGS. 8 and 10 are similar to the first embodiment. Hereafter, only FIG. 11 is described.

FIG. 11 is a detailed flowchart showing a subroutine 1100, that is, step 804 in FIG. 8. The subroutine 1100 includes processes for operating the electric power limit PLMT.

The air pressure PAIR controlled about the pressure is detected in step S1101. The hydrogen pressure PH2 controlled about the pressure is detected in step S1102. The air mass flow rate WAIR controlled about the mass flow rate is detected in step S1103. The hydrogen mass flow rate WH2 controlled about the mass flow rate is detected in step S1104. In step S1105, the electric power limit PLMTPAIR corresponding to the detected air pressure PAIR is operated by both the detected air pressure PAIR and the table data in FIG. 4A. In step S1106, the electric power limit PLMTPH2 corresponding to the detected air pressure PH2 is operated by both the detected hydrogen pressure PH2 and the table data in FIG. 4A. In step S1107, the electric power limit PLMTWAIR corresponding to the detected air mass flow rate WAIR is operated by both the detected air mass flow rate WAIR and the table data in FIG. 4B. In step S1108, the electric power limit PLMTWH2 corresponding to the detected hydrogen mass flow rate WH2 is operated by both the detected hydrogen mass flow rate WH2 and the table data in FIG. 4C. In step S1109, comparing the PLMTPAIR, the PLMTPH2, the PLMTWAIR and the PLMTWH2, the lowest electric power limit among the PLMTPAIR, the PLMTPH2, the PLMTWAIR and the PLMTWH2 is substituted to the electric power limit PLMT. A sequence of the detections, the operations and the controls is completed by the above steps.

The fuel cell system is configured to enable the detection of both the air mass flow rate and the hydrogen mass flow rate in the present embodiments. However, the system may be configured to only reflect the electric power limit based on the gas about which the mass flow rate can be detected where one of the above mass flow rates cannot be detected alone. Further, where either the pressure or the mass flow rate of the hydrogen cannot be controlled, by design changing the hardwares including the ejector and the like, the sufficient flow of the hydrogen may be secured so as not to lower the output voltage from the fuel cell. Then, the electric power limit is executed by only the pressure of the hydrogen.

In the foregoing embodiments, the profile of the target electric power against time is step-like configuration and the output power is limit by the detected pressure and mass flow rate of the gas. The following method may be applied to the output power limit. Namely, the limiter of the rate of change is set close to the target electric power, thereby the target gas pressure and target gas mass flow rate do not radically vary. Then, the output power limit by the detected pressure and mass flow rate of gas is executed.

Figure 12A:
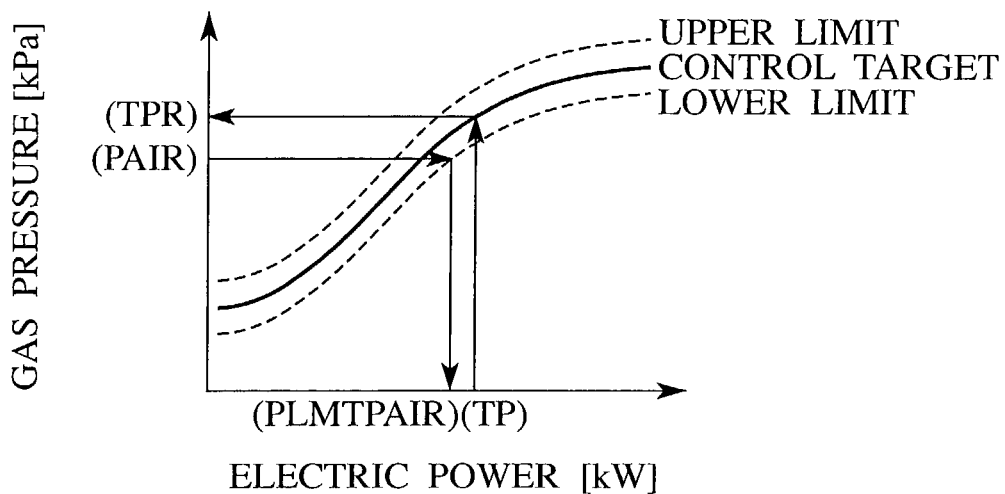
FIG. 12A exemplifies a modified diagram of FIG. 3A or FIG. 4A, and shows a relation between electric power and gas pressure.
Figure 12B:
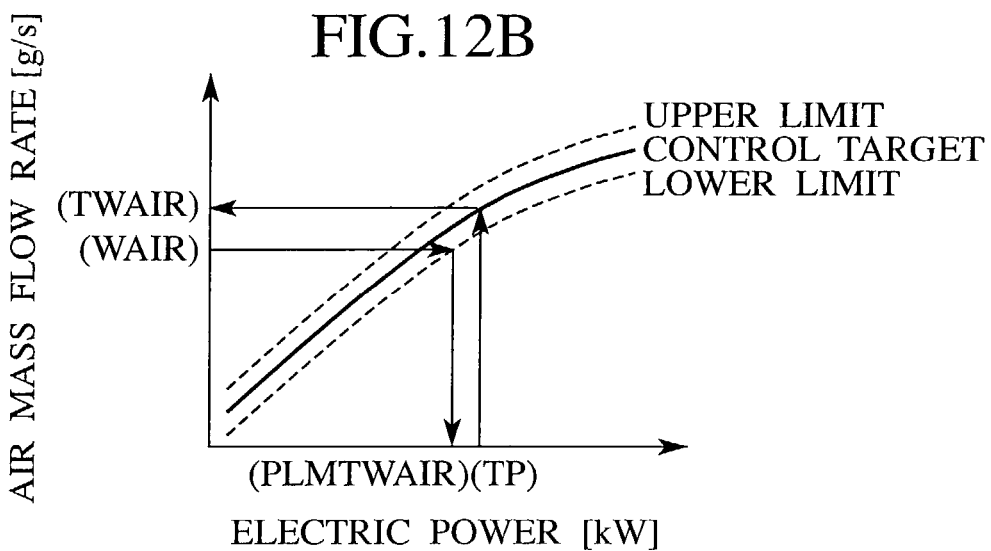
FIG. 12B exemplifies a modified diagram of FIG. 3B or FIG. 4B, and shows a relation between electric power and air mass flow rate.
Figure 12C:
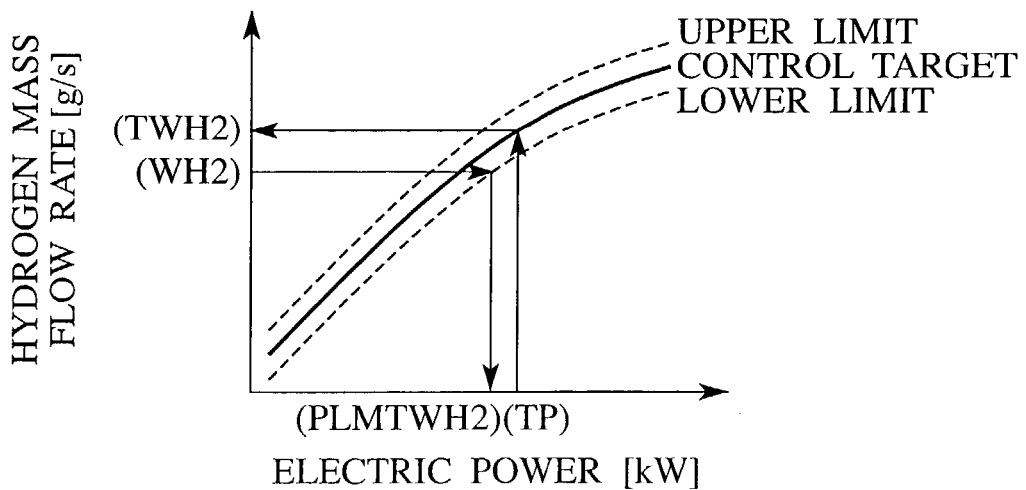
FIG. 12C exemplifies a modified diagram of FIG. 3C or FIG. 4C, and shows a relation between electric power and hydrogen mass flow rate.

Moreover, FIGS. 3A to 3C (illustrates table data with which the target running point is obtained) and FIGS. 4A to 4C (illustrates table data with which the electric power limit is obtained) are independently provided in the foregoing embodiments. As shown in FIGS. 12A to 12C (these figures are change examples of FIGS. 3A to 3C and 4A to 4C), tables, in which the electric power vs. the gas pressure (corresponding to FIG. 12A), the electric power vs. the air mass flow rate (corresponding to FIG. 12B) and the electric power vs. the hydrogen mass flow rate (corresponding to FIG. 12C) are recorded, may be prepared. Then, the same above tables may be referred to where the target running point is obtained or where the electric power limit is obtained.

According to the first aspect of the present invention, targets of both pressure and mass flow rate of gas being at least supplied to the fuel cell are operated based on the target electric power, a running point of the fuel cell is controlled based on the targets of both the pressure and the mass flow rate of the gas, a running state as a control result of the fuel cell is detected, a producible output power produced by the fuel cell is operated based on the running state, a commanded output power is operated based on the producible output power and the electric power of the fuel cell is controlled. Therefore, even if the running point of the fuel cell does not achieve the target point at the transient time at which the output power increases, the output power is produced in response to the running state at the transient time, thereby preventing the output voltage from radically being lowered and preventing the fuel cell from deteriorating.

According to the second aspect of the present invention, the commanded output power in the commanded output power operating unit is determined by a method, that is, if the producible output power is lower than the target electric power, then the commanded output power is defined as the producible output power, or else if the target electric power is lower than the producible output power, then the commanded output power is defined as the target electric power. Even if the electric power limit, which is operated based on the running state, is higher than the target electric power for some reason, the commanded output power is operated based on the target electric power. Accordingly, the defects that the output power is produced too much and that the commanded output power is higher than the generatable electric power can be restricted.

According to the third aspect of the present invention, the pressure of the gas as a running state is detected, so that a maximum output power can be produced in response to the detected gas pressure at the time.

According to the fourth aspect of the present invention, the mass flow rate of the gas as a running state is detected, such that a maximum output power can be produced in response to the detected gas mass flow rate at the time.

According to the fifth aspect of the present invention, the target pressure of the gas and/or the target mass flow rate of the gas are operated under a predetermined relation between the target electric power and the target pressure/mass flow rate of the gas based on the target electric power. Further, the output upper limit is operated under a reverse relation to the predetermined relation based on the running state. Therefore, an optimum output power is produced corresponding to the running state of the fuel cell.

According to the sixth aspect of the present invention, the output limit, which is ultimately produced from the fuel cell, is defined as a minimum value in a plural upper limits being operated from a plurality of the detected running states. Accordingly, even if the running point of the fuel cell does not achieve the target point at the transient time at which the output power increases, the safest output power is produced in response to the running state at the transient time, thereby preventing the output voltage from radically being lowered and preventing the fuel cell from deteriorating.

According to the seventh aspect of the present invention, the lower limit of the running target point under a predetermined relation between the electric power and the running state of the fuel cell is operated based on the target electric power, and the output upper limit from a reverse relation to the predetermined relation based on the lower limit of the running target point. Therefore, allowable running points have a wide range but it is prevented that the output power is lowered by restricting the output power limit.

According to the eighth aspect of the present invention, the pressure of the gas or the mass flow rate of the gas is a quantity of state of both a fuel gas and a oxidizer gas to generate the electric power in the fuel cell, so that the fuel cell system is capable of being controlled more accurately.

According to the ninth aspect of the present invention, both the running target point operating means and the output power limit operating means refer to a common table which records relations between the running point and the electric power, whereby enables the saving of the memory of the control unit and the reduction of man-hours in setting the control constant.

The present disclosure relates to subject matters contained in Japanese Patent Application No. 2001-223169, filed on Jul. 24, 2001, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. An apparatus for controlling an electric power from a fuel cell, comprising:
    target electric power operating means for determining a target electric power of the fuel cell;
    running target point operating means for determining targets of both pressure and mass flow rate of gas to be supplied to the fuel cell based on the target electric power determined by the target electric power operating means;
    running point controlling means for controlling a running point of the fuel cell based on the gas pressure and mass flow rate targets determined by the running target point operating means;
    running state detecting means for detecting a running state of the fuel cell from the running point determined by the running point controlling means;
    producible output power operating means for determining a producible output power corresponding to the maximum output power to be produced by the fuel cell by defining an output limit in the producible output power operating means as a minimum value of a plurality of upper limits being operated from plural running states detected in the running state detecting means; and
    commanded output power operating means for determining a commanded output power to produce the electric power from the fuel cell by employing a minimum value of the producible output power determined by the producible output power operating means and the target electric power determined by the target electric power operating means.

2. The apparatus according to claim 1,
    wherein the commanded output power operating means is further configured to determine the commanded output power to be the producible output power if the producible output power is lower than the target electric power and to determine the commanded output power to be the target electric power if the target electric power is lower than the producible output power.

3. The apparatus according to claim 1,
    wherein the running state detecting means is further configured to detects the running state which has the pressure of the gas.

4. The apparatus according to claim 1,
    wherein the running state detecting means is further configured to detects the running state which has the mass flow rate of the gas.

5. The apparatus according to claim 1,
    wherein the running target point operating means is further configured to determine the target of the pressure of the gas and/or the target of the mass flow rate of the gas under a predetermined relation between the target electric power and the target of the pressure/the mass flow rate of the gas, based on the target electric power determined by the target electric power operating means, and
    wherein the producible output power operating means is further configured to determine an output upper limit under a reverse relation to the predetermined relation used in the running target point operating means, based on the detected running state by the running state detecting means.

6. The apparatus according to claim 1,
    wherein the running target point operating means is further configured to determine both a control target of the running state and a lower limit of the running state,
    wherein the running point controlling means is further configured to control the running point of the fuel cell based on the control target of the running state, and
    wherein the producible output power operating means is further configured to determine an upper limit of an output power from a reverse relation to the relation used in the running target point operating means based on the lower limit of the running state.

7. The apparatus according to claim 1,
    wherein the pressure of the gas or the mass flow rate of the gas corresponds to a quantity of state of both a fuel gas and an oxidizer gas to generate the electric power in the fuel cell.

8. The apparatus according to claim 1
    wherein both the running target point operating means and the producible output power operating means comprise a common table that records a relation between the running point and the electric power.

9. The apparatus according to claim 1,
    wherein the target electric power operating means is configured to determine the target electric power based on operational conditions of a device powered by the fuel cell.

10. The apparatus according to claim 9,
    wherein the device is a vehicle and the operational conditions of the vehicle include an accelerator pedal position and a vehicle speed.

11. A fuel cell system comprising:
    a fuel cell stack;
    a gas supply system supplying gas to the fuel cell stack for generating an electric power;
    a gas pressure gauge detecting a pressure of the gas supplied to the fuel cell stack;
    a gas flow meter detecting a mass flow rate of the gas supplied to the fuel cell stack;
    a valve system adjusting the pressure and the mass flow rate of the gas supplied to the fuel cell stack; and
    a controller configured to control the electric power from the fuel cell stack,
    wherein the controller comprises:
    a target electric power operating unit that determines a target electric power of the fuel cell stack;
    a running target point operating unit that determines targets of both pressure and the mass flow rate of the gas to be supplied to the fuel cell stack based on the target electric power determined by the target electric power operating unit;
    a running target point operating unit that determines target of both pressure and the mass flow rate of the gas to be supplied to the fuel cell stack based on the target electric power determined by the target electric power operating unit;

a running point controlling unit that controls a running point of the fuel cell stack based on the gas pressure and mass flow rate targets determined by the running target point operating unit;

a producible output power operating unit that detetrmines a producible output power corresponding to the maximum output power to be produced by the fuel cell stack by defining an output limit in the producible output power operating unit as a minimum value of a plurality of upper limits being operated from the pressure and the mass flow rate detected by the gas pressure gauge and the gas flow meter, respectively, with the gas being supplied to the fuel cell stack in a running state thereof where the valve system is actuated as a result of the running point determined by the running point controlling unit; and a commanded output power operating unit that determines a commanded output power to produce the electric power from the fuel cell stack by employing a minimum value of the producible output power determined by the producible output power operating unit and the target electric power determined by the target electric power operating unit.

* * * * *